United States Patent [19]

Winiecki

[11] 4,416,465
[45] Nov. 22, 1983

[54] CRASH RESISTANT MOTORCYCLE

[75] Inventor: Tadeus Winiecki, San Diego, Calif.

[73] Assignees: Martha Winiecki; Henry Winecki, both of Vancouver, Wash.; a part interest

[21] Appl. No.: 214,347

[22] Filed: Dec. 8, 1980

Related U.S. Application Data

[62] Division of Ser. No. 143,527, Apr. 24, 1980, Pat. No. 4,311,335.

[51] Int. Cl.³ .............................................. B62J 27/00
[52] U.S. Cl. ........................................ 280/290; 2/2; 2/DIG. 3; 280/289 E; 280/751; 296/188; 297/464
[58] Field of Search ........... 280/289 E, 289 R, 289 G, 280/290, 751, 756, 805; 54/23, 70; 128/78, 133, 134; 2/2, DIG. 3; 297/216, 464, 472; 296/78.1, 188; 188/374, 47

[56] References Cited

U.S. PATENT DOCUMENTS

| | | | |
|---|---|---|---|
| 635,683 | 10/1899 | Herman | 280/290 |
| 2,401,748 | 6/1946 | Dillon | 280/290 X |
| 3,026,972 | 3/1962 | Hendry et al. | 297/472 X |
| 3,524,678 | 8/1970 | De Lavenne | 280/751 X |
| 3,532,379 | 10/1970 | Reilly et al. | 297/216 |
| 3,792,896 | 2/1974 | Eggert, Jr. | 297/216 |
| 4,082,350 | 4/1978 | Tomforde | 297/243 |
| 4,311,335 | 1/1982 | Winiecki | 296/78.1 |

FOREIGN PATENT DOCUMENTS

| | | | |
|---|---|---|---|
| 2623147 | 12/1977 | Fed. Rep. of Germany | 280/751 |
| 85645 | 2/1957 | Netherlands | 280/290 |

*Primary Examiner*—Joseph F. Peters, Jr.
*Assistant Examiner*—Mitchell J. Hill
*Attorney, Agent, or Firm*—Frank D. Gilliam

[57] ABSTRACT

A motorcycle having a number of cooperating protective features to protect riders against injury in high speed crashes or other accidents. A motorcycle of the usual basic configuration, having a pair of wheels in tandem with a motor therebetween connected by a basic frame which supports at least one rider's seat assembly and a steering assembly for steering the front wheel is surrounded by a cage assembly of high strength, light-weight tubing fastened to the frame and forming part of the frame. A body covering covers the cage. At least one door is provided at the side of the rider. When fully open, the door extends outwardly in a manner such that the lower outer end of the door can engage the ground with the motorcycle tilted slightly in that direction to function as a sturdy, stable side stand. The seat assembly is in the form of a padded "bucket" type seat with sides that extend partially around the rider's sides. A padded body restraint surrounds the front of the rider's torso and includes side portions which extend around into contact with the seat sides to completely surround the rider's torso. Adjustable, padded headrest and collar devices are provided to limit head movement in an accident. A shock absorber is provided to absorb impact energy causing the seat and body restraint to move forwardly upon frontal collision between the motorcycle and another object. A retrieval means returns the seat and body restraint to the original position after impact forces are absorbed. The steering assembly includes handlebars which are padded and mounted on a folding mechanism to move forwardly as the seat moves forwardly upon front impact. An anti-somersault extension on the front of the cage is provided to prevent the motorcycle somersaulting after a frontal impact.

3 Claims, 11 Drawing Figures

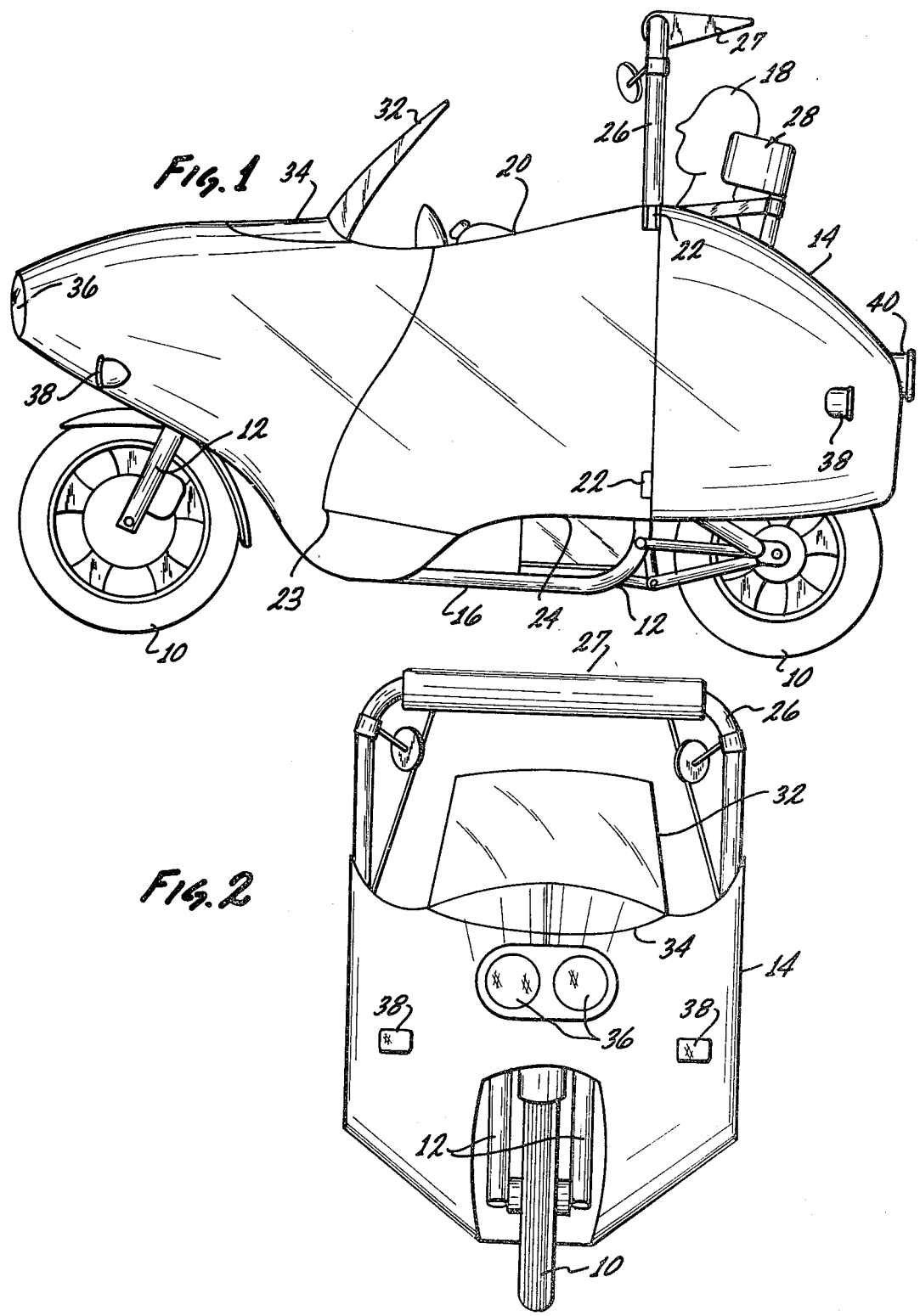

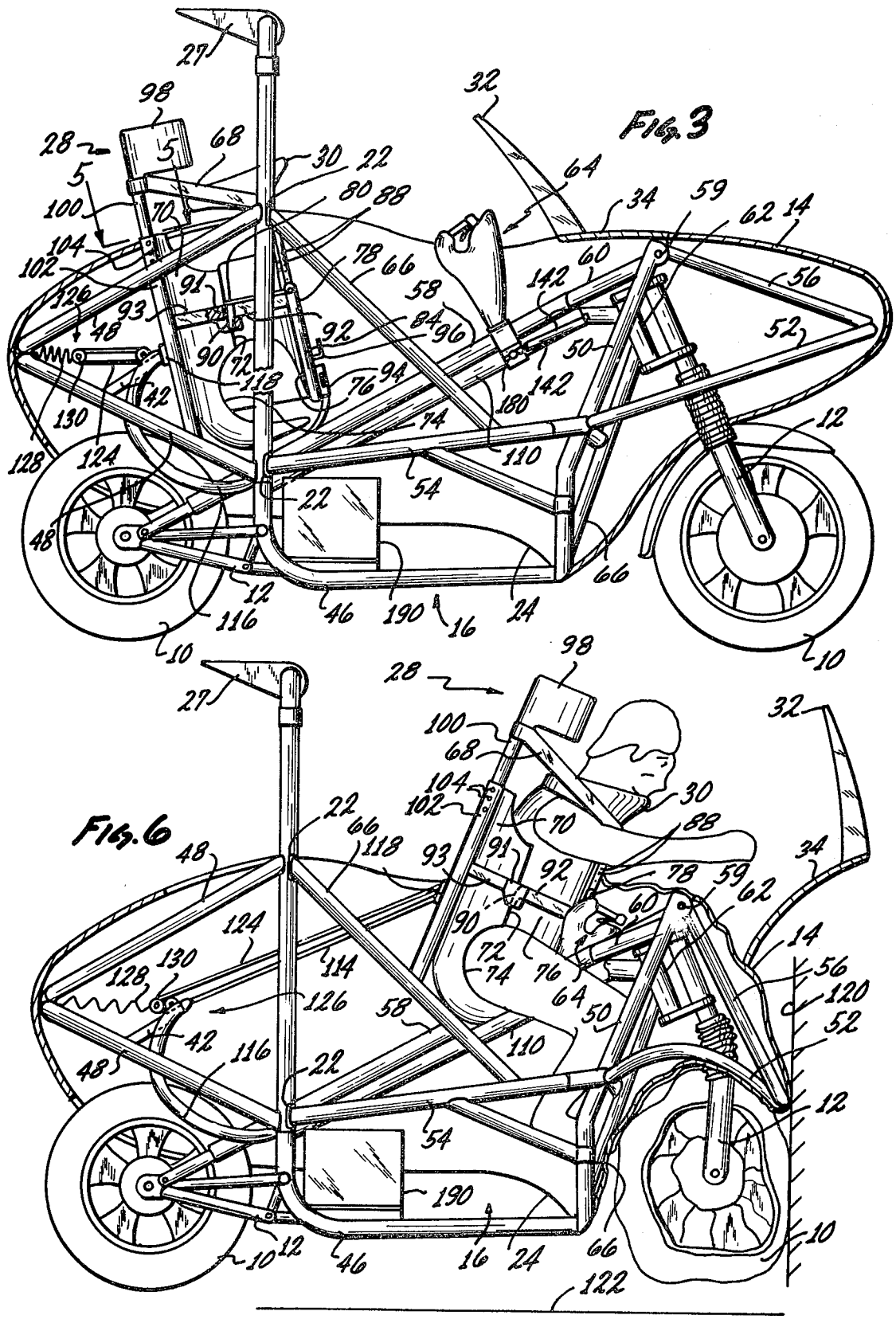

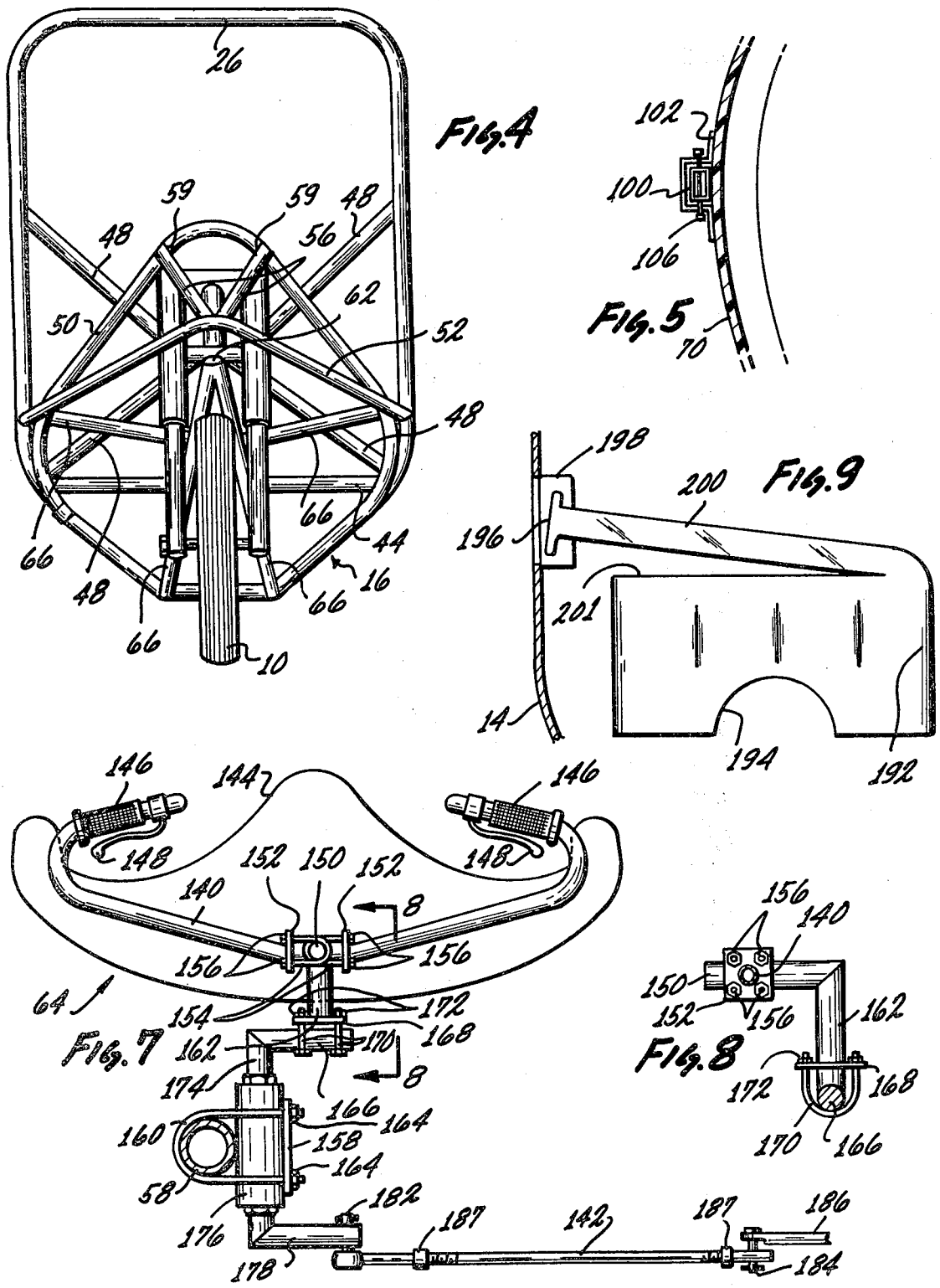

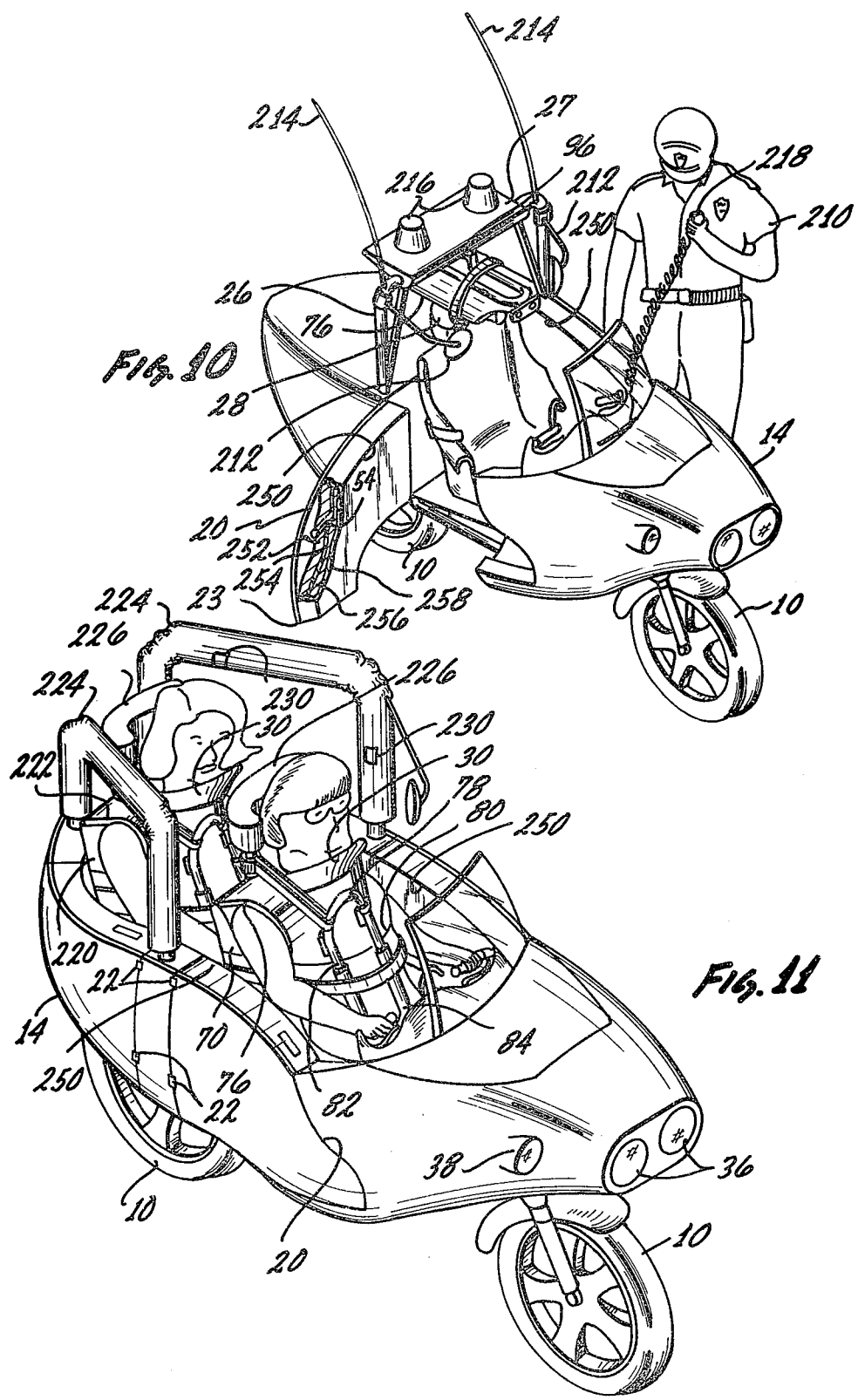

CRASH RESISTANT MOTORCYCLE

This is a division of U.S. Pat. No. 4,311,335 issued Jan. 19, 1982.

BACKGROUND OF THE INVENTION

This invention relates in general to motorcycles and, more specifically, to a motorcycle system for protecting a rider in the event of an accident.

Motorcycles are being ridden by increasing numbers of people for a variety of reasons. Many peope enjoy riding them for the sense of freedom and control they provide. Motorcycles also provide a relatively inexpensive mode of transportation when compared to automobiles.

More people would ride motorcycles if it were not for fear of injury resulting from collisions with automobiles, running off of slippery roads, etc. Even with helmets and protective clothing, a motorcycle rider is much more likely to be injured in such an accident than is a person in an enclosed automobile.

Attempts have been made to add protective cages to motorcycles, tractors, snowmobiles and the like in which an operator ordinarily rides in an exposed position. Typical of such protective cages are those described in U.S. Pat. Nos. 1,473,956, 2,783,056, and 3,704,031. While such cages are of some help in low-speed, roll-over type accidents, they are of little assistance in higher speed, front impact type accidents, since the operator's body is relatively unrestrained (even if wearing a seat belt) and likely to be injured by the cage itself or other vehicle parts due to impact inertial forces acting on his body.

In my earlier U.S. Pat. No. 3,878,561, I disclosed an armored jacket for motorcycle riders which aids in protecting the head and body of a rider against injury in an accident. While helpful, this jacket does not protect the rider's arms and legs and does not fully protect against injuries when the rider is ejected from the motorcycle by impact forces.

Since motorcycle wheels are below the rider, when the motorcycle strikes a solid object such as an automobile the motorcycle tends to somersault, either crushing the rider between motorcycle and object or causing the rider to fly over the handlebars and object and land, often on his head, some distance away, usually resulting in death or severe injuries.

With conventional motorcycles, to achieve reasonable safety in the event of even minor accidents requires that the rider wear a helmet, boots, special protective clothing, heavy gloves, etc. This protective clothing is often uncomfortable, and considerable time is expended in dressing and undressing before and after riding. Also, ordinary clothing must often be carried for use at the destination and the protective clothing must be stored at the destination. Even with front fairings and windshields, the rider is largely exposed to adverse weather, heat, cold, rain, etc. All of this tends to make ordinary motorcycles less convenient than automobiles or other enclosed means of transportion.

When not in use, motorcycles are usually supported by a short rod-like "kick stand" extendable from the lower side of the motorcycle. In soft earth or asphalt, the kick stand often sinks into the surface, allowing the motorcycle to fall over, resulting in damage to the motorcycle and difficulty in lifting the often heavy cycle back up.

Thus, there is a continuing need for improvements in motorcycle construction to protect riders against injuries in collisions or other accidents and to make the motorcycles more comfortable and convenient to ride.

SUMMARY OF THE INVENTION

The above problems, and others, are overcome by adding a number of cooperating safety devices to a basically conventional motorcycle design to produce a motorcycle of improved crash resistance, convenience and comfort. A cage of typically high-strength, lightweight tubing is fastened to the conventional motorcycle's frame (or forms part of the frame) and surrounds the front, sides and back of the rider or riders. The usual pair of tandem wheels, rider's seat, motor and steering mechanism are all mounted on the motorcycle frame within the cage. At least one door is provided adjacent to the rider for convenient entry into the cage. At least one door has a sturdy lower edge which is adapted, when the door is fully open, to engage the ground and serve as a stable side stand. The cage may be covered with any suitable material, such as aluminum, fiberglass reinforced plastics, etc., to provide support for padding next to the rider, protect the rider from wind and weather, and reduce aerodynamic drag.

The rider's seat is of the "bucket" configuration with the back having side portions which extend forwardly partially around the rider's sides. A body restraint is fastened to the seat with a quick release means which is resistant to opening under impact forces. The seat has mounted thereon an adjustable head rest positioned just behind the rider's head. A padded collar is mounted at the top of the body restraint around and below the front and sides of the rider's head. The height of the collar is adjustable.

The seat is not rigidly fastened within the cage so that the seat may move forwardly upon a front collision impact. A shock absorber is attached to the back of the seat to absorb impact energy as the seat and body restraint move forward. A retraction means is also attached to the back of the seat to return the seat and body restraint to its original position after impact forces have been dissipated.

A front extension is provided on the frame and cage over and ahead of the front wheel with a forward-most point above the horizontal center of mass of the motorcycle and rider to help absorb front collision energy and prevent motorcycle somersaulting.

A padded, folding steering assembly is provided to move out of the way as the seat moves forward bringing the body restraint into contact with the steering mechanism. Similarly, if a windshield and front cowl means are provided as part of the body covering immediately in front of the rider, they are preferrably mounted in a manner permitting them to break away as the seat moves forward in response to a front impact.

Other preferred embodiments will be described in the detailed description of the invention which follows.

BRIEF DESCRIPTION OF THE DRAWING

Details of the invention, and of preferred embodiments thereof, will be further understood upon reference to the drawing, wherein:

FIG. 1 is a left side elevation view of the motorcycle of this invention;

FIG. 2 is a front elevation view of my crash resistant motorcycle;

FIG. 3 is a schematic right side elevation view of my crash resistant motorcycle with the near side of the body and some internal components removed for clarity;

FIG. 4 is a front elevation view of the protective cage of my motorcycle;

FIG. 5 is a detail cross-sectional view illustrating the head rest height adjustment mechanism, taken on line 5—5 in FIG. 3;

FIG. 6 is a schematic side elevation view of my motorcycle with the near body side and other components eliminated for clarity, while involved in a front end collision;

FIG. 7 is a detail elevation view showing the foldable steering mechanism;

FIG. 8 is a detail section view of the handlebar mounting means, taken on line 8—8 in FIG. 7;

FIG. 9 is a schematic detail elevation view of a non-spill fuel tank;

FIG. 10 is a perspective view of an alternative embodiment of my motorcycle especially adapted for police use; and FIG. 11 is a perspective view of an alternative embodiment adapted to carry two riders.

DETAILED DESCRIPTION OF THE INVENTION

Referring now to FIGS. 1 and 2, there is seen a crash-resistant motorcycle including a pair of conventional wheels 10 arranged in tandem with a basically conventional frame 12 interconnecting wheels 10 and supporting the engine, drive means, steering means and other usual components (not shown in these Figures for clarity of illustration of the novel components). While portions of a conventional frame are used, e.g., the portions supporting the wheel forks, much of the usual motorcycle frame is preferably replaced by portions of the cage detailed below. As used in this specification, "frame" refers to those portions comparable to a conventional frame and added portions which act primarily as supports for the wheels and internal components, while "cage" relates primarily to the surrounding protective members. A streamlined body 14 surrounds the motorcycle. Body 14 may be formed from any suitable material such as aluminum, steel, plastics, fiberglass reinforced resins, etc. Body 14 is mounted on a cage-like structure 16 (a small portion of which is seen in FIG. 1) which surrounds the sides of the motorcycle and rider 18.

A door 20, hinged by hinges 22 at the back, is provided on one or both sides of body 14. As further detailed below, when door 20 is fully opened, so as to lie substantially perpendicular to the side of body 14, the lower front corner 23 of door 20 can be rested on the ground, with the motorcycle leaning slightly toward the open door, to form a stable, sturdy side stand. The body 14 is cut-away below door 20 at 24 to provide openings through which a seated rider 18 may extend his feet into contact with the ground to support the motorcycle when it is stopped.

A roll bar 26 extends upwardly from cage 16 around rider 18 to protect the rider in the event of a roll-over type accident. A fin 27 at the top of roll bar may be included for aerodynamic purposes, to shade the rider somewhat from the sun and to provide a convenient mount for accessories, as further discussed below. Fin 27 basically comprises padding in a streamlined shape, covered with a protective layer of plastic, cloth, etc.

The rider's head is also protected from excessive movement during an impact from any direction by a head rest 28 and a padded collar 30, described in detail below.

A windshield 32 mounted on a cowl fairing 34 protects rider 18 against relative wind while in motion. Since the rider might strike windshield 32 when he moves forward during a frontal impact as described below, windshield 32 and cowl 34 are preferably releasably mounted, such as by gripper snaps, Velcro ® patches or the like, on body 14 so as to release on impact.

Body 14 may carry any suitable components, such as conventional headlamps 36, turn signals 38, tail lights 40, etc.

The components of my motorcycle system which contribute to its crash resistant characteristics are schematically illustrated in FIGS. 3 and 4. Body 14 is removed from the near side in FIG. 3 and entirely in FIG. 4. Most conventional motorcycle internal components, such as motor, drive system, lights, control cables, etc., are not shown to permit the novel components to be shown with utmost clarity.

Cage 16 consists of a plurality of shaped tubes surrounding the rider and motorcycle internal components. These tubes combine high strength and light weight. The tubes may have any suitable cross-sections and configurations, and may be formed from any suitable material, such as steel or aluminum.

The basic cage 16 includes an extension of roll bar 26 which continues down to a main cross member 44 (FIG. 4) lower tubes 46 extend down and forward from cross member 44. Two V-shaped braces 48 extend so that their apices meet at a common point behind roll bar 26, forming a rearward pointing pyramid. A brace 42 fastened to braces 48 supports the seat energy absorbing assembly and the retraction assembly, as detailed below. A main forward tube 50 extends from lower tube 46 on one side, up over the front wheel 10 and back down to become lower tube 46 on the other side. A second forward tube 52 of lower strength than tube 50 also extends forwardly from a connection with a side tube 54 around the front of the motorcycle and back to a side tube 54 on the other side. A pair of links 56 (having greater strength than second forward tube 52) are rigidly fastened to forward tube 52 and pivotably connected to pivots 59 on main forward tube 50. The forwardmost point where tube 52 meets links 56 is higher than the horizontal center of mass of motorcycle and rider. The assembly of tubes 50 and 52 and links 56 serves as an antisomersault front end, the operation of which will be described in conjunction with the description of FIG. 6, below.

A central tube 58 extends from cross member 44 to forward tube 50 which extends around the front wheel steering head 62. Central tube 58 supports the foldable handlebar assembly generally designated 64. Additional braces 60 and 66 are provided, as desired, to add further to the rigidity of cage 16.

A padded bucket type seat 70 within cage 16 has padded side portions 72 that extend partially around a rider's sides to help protect him in the event of impacts from the side. The seat is cut away at 74 so that a rider may easily extend his legs downwardly so as to stand on the ground when the motorcycle is stopped while remaining partially seated in seat 70. The seat 70 fits within the volume formed by braces 48 and is preferrably "nested" in padding (not shown in FIGS. 3 and 4 but seen in FIGS. 10 and 11) on braces 48 to support it in the position shown in FIG. 3. A padded body restraint 76 surrounds the rider's front torso and includes side portions which mesh with side portions 72 of seat 70 to completely surround the rider's upper torso. The body restraint 76 typically is formed aluminum or fiberglass reinforced plastic shell, padded on the inside and having a generally oval brace 78 secured to the front surface. The configuration of brace 78 is best seen in FIG. 11. While one size body restraint 76 will fit many people, or the body restraint can be fitted to the motorcycle owner, an adjustable restraint is preferred if several people are to use the motorcycle. In that event, the restraint shell is made in two overlapping pieces, divided along a substantially horizontal line 80. The padding in the region of the overlap is not fastened rigidly to the shell to allow the amount of shell overlap to be varied. Brace 78 is then formed as two telescoping U-shaped sections. The upper section 82 is secured to the upper portion of the body restraint shell and the lower section 84 is secured to the lower portion of the shell. Upper section 82 is moved inwardly and outwardly of lower section 84 until padded collar 86 is located at the desired position for the intended rider. Then bolts or other fasteners (not shown) are inserted through holes 88 passing through both sides of both sections to fasten the sections together.

Body restraint 76 is fastened to seat 70 (after the rider enters the seat) by a tapered pin 90 which enters a vertical hole in fittings 91 located near the ends of straps 92 on each side of the seat assembly and by a quick release buckle 94 (of the type used with conventional automobile or aircraft seat belts) which connects the upstanding front edge of seat 70 to the lower front edge of body restraint 76. A padded belt or strap 68 extends from the upper edge of body restaint 76 to head rest 28 to protect the rider's shoulders and help guide the body restraint 76 between the open and closed positions.

When a rider desires to leave the seat, buckle 94 is released, the body restraint 76 is lifted upwardly to disengage pin means 90 from fitting 91, and body restraint 76 is moved up and back until hook 96 on the front of the body restraint hooks over the front edge of fin 27 on roll bar 26. Body restraint 76 is thus held out of the way while the rider opens door 20 by releasing door latch (not shown), rests the motorcycle on the door corner 22 as a side stand, then moves out of seat 70 and leaves through the open door. Of course, any other holding means, such as the hook-and-eye fasteners available under the "Velcro®" trademark or other clips, may be used in place of hook 96 to hold body restraint 76 against roll bar 26.

As mentioned above, a head rest 28 is secured to seat 70 to protect the rider's head against rear impacts. Head rest 28 includes a padded upper portion 98 and a channel or box section vertical support 100 extending down along the back of seat 70. As seen in FIGS. 3 and 5, support 100 extends into a hat section member 102 fastened to the back of seat 70 by bolts, rivets or the like. A plurality of holes 104 extend transversely through both support 100 and hat section member 102. Thus, the padded portion 98 is adjusted vertically until it is located at the desired position adjacent to the rider's head, then a bolt 106 is inserted through matching holes in support 100 and member 102 to secure head rest 28 at the selected height.

The mechanism, and operation thereof, for allowing the seat assembly to move during a frontal impact to absorb impact energy is best seen in FIGS. 3 and 6. As mentioned above, seat 70 is located in the position shown in FIG. 3 by surrounding padding (not shown), but is not rigidly fastened to cage 16. An elongated shock absorber 110 is securely fastened to the underside of central tube 58. While any suitable shock absorber may be used, that disclosed in U.S. Pat. No. 3,026,972 is preferred, since it provides constant force energy absorption and is simple in construction, allowing long periods before use without deterioration. The shock absorber shown in that patent uses a round outer tube into which is forced a square plug having rounded corners. The cross-sectional area of the plug is equal to or slightly greater than the interior cross-section of the tube. A cable 114 extends down through shock absorber 110, through a sturdy guide tube 116 and is fastened to a sturdy plate 118 on the back of seat 70. Typically, the shock absorber provides a constant limiting resisting force of about 60,000 Newtons. As seen in FIG. 6, upon collision with an object such as wall 120 in front of the motorcycle, the second forward tube 52 collapses as links 56 pivot about pivot pins 59, causing an upward force on pivot pins 59. While the motorcycle will lift slightly off the ground 122, it will not somersault.

Under inertial forces resulting from the collision, the rider and seat assembly are propelled forwardly. Cable 114 is pulled through guide tube 116, pulling the plug through the tube 110 and deforming the tube. Since the tube deformation force required is uniform through the entire tube length, a constant resisting force is applied to seat and rider. Preferably, the force on the seat is about 750 m./sec.$^2$ multiplied by the mass of the rider and seat assembly.

As seat and rider move forwardly, the body restraint 78 contacts handlebar assembly 64, causing it to fold (as described in detail in conjunction with the description of FIGS. 7 and 8, below). While folding, handlebar assembly 64 strikes the windshield 32, causing the releasable fasteners holding cowl fairing 34 to body 14 to release, allowing the windshield and cowl to move forwardly.

When shock absorber 110 stops forward movement of seat and rider, retraction device 126 immediately pulls seat and rider back to approximately the position seen in FIG. 3. In any accident, secondary impacts are probable and the rider is surrounded by the maximum protection in that position. Typically, the retraction force should be about 2000 Newtons initially from the position of the seat in FIG. 6.

Retraction assembly 126 consists of a heavy spring 128 securely fastened at one end to the apex of the pyramid formed by braces 48 and at the other end to a schematically illustrated conventional block-and-tackle type pulley assembly 130. Assembly 130 consists of two frames each holding a plurality of parallel pulley sheaves. The other end of the pulley assembly is fastened to brace 42. Line or cable 124 is fastened to one end of pulley assembly 130, is threaded back and forth around all of the pulley sheaves, then is fastened to plate 118. As seat 70 moves forwardly after a frontal impact, line 124 extends, stretching spring 128 and moving the ends of pulley assembly closer together. Once forward movement of seat and rider ends, spring 128 pulls the line 124 back through pulley assembly 130. Seat 70 returns to approximately the original position to protect the rider against secondary impacts. Thus, a rider is likely to receive only bruises and abrasions even from a very serious collision.

The preferred handlebar assembly 64, which provides convenient steering while moving out of the way during severe frontal impact, is shown in detail in FIGS. 3, 7, and 8. The handlebar assembly is designed so that the rider can exert maximum force on the handlebars while sitting in the most comfortable riding position. Because the motorcycle frame is long and the seat leans back, the handlebars 140 are not mounted directly on steering head 62 but are set back closer to the rider with a tie rod 142 to connect them to steering head 62. Since the handlebar assembly 64 is in the path of the rider's forward movement during a frontal collision (as seen in FIG. 6) handlebars 140 are covered with padding 144 on the side toward the rider and are designed to fold as the rider moves forward. Padding 144 is best seen in FIG. 3, being illustrated in outline form only in FIG. 7, for clarity. Handlebars 140 include grips 146 which include conventional cable actuated controls 148 for throttle, brakes, etc. While steering head 62 is slightly off vertical and the handlebar assembly leans slightly toward the rider, for convenience in describing these devices, steering head 62 will be thought of as "generally" vertical.

As seen in FIGS. 7 and 8, handlebars 140 are in two halves, the ends abutting a tube 150. Flanges 152 are welded near the ends of the handlebar halves as shown. U-bolts 154 surround tube 150 from the two sides and extend through holes in flanges 152. As nuts 156 are tightened, the ends of the halves of handlebars 140 are tightly drawn toward and pressed against tube 150, securing the handlebars in the selected alignment. However, if excessive force, such as the impact of the rider during a collision, is applied to the handlebars 140, the halves can each be forced to pivot upwardly (as seen in FIG. 7) about tube 150. Tube 150 is welded to a vertical tube 162, and may be thought of as an extension of tube 162.

The lower end of tube 162 bears against upper crank arm 166. A flange 168 is welded to tube 162 near that end. A pair of U-bolts extend around crank arm 166 and through holes in flange 168. As nuts 172 on the threaded ends of U-bolts 170 are tightened, the end of tube 162 is brought into tight friction contact with crank arm 166. The tube 162 will slip on crank arm 166 only when excessive forces are applied, such as in a frontal collision.

Crank arm 166 is fastened, such as by welding, to a rod 174 which extends through a bearing 176 to a lower crank arm 178. Bearing 176 is secured by an assembly consisting of a flange 158, a pair of U-bolts 160 and nuts 164, to central tube 58.

Lower crank arm 178 is connected by a loose bolt 182 to adjustable tie rod 142, which is connected through a loose bolt 184 to a conventional crank arm 186 connected to the fork of front wheel 10 at the front wheel head 62. Nuts 187 are movable to adjust the length of tie rod 142. Since the bearing 176 is attached to central tube 58 with U-bolts, the handlebar assembly can be moved nearer or farther from the rider by sliding the bearing 176 along tube 58 and adjusting the tie rods.

Thus, as handlebars 140 are rotated in a substantially horizontal plane, corresponding rotation of the wheel steering shaft is accomplished. In the event of a frontal collision, the rider, seat 70 and body restraint 76 move forwardly as seen in FIG. 6 until the front surface of body restraint 76 impacts padding 144 over handlebars 140. This impact causes the padding to crush somewhat and causes the handlebar assembly to fold forwardly as tube 162 slips over upper crank 166 (FIG. 8) while the handlebar assembly pivots about a fore-and-aft axis around tube 150 to absorb energy and push the handlebars out of the rider's way no matter how the handlebars may have been oriented at the moment of impact. Thus, handlebar movement about two axes is accommodated in a collision even though normal steering forces do not cause premature folding of the handlebar assembly components.

A fuel tank configuration which is preferred for use with the motorcycle of this invention is schematically illustrated in FIG. 9. The fuel tank may be located at any suitable position within body 14, such as the position schematically suggested at 190 in FIG. 3. Tank 192 is seen in FIG. 9 viewed from a position within body 14 forward of the tank and looking toward the back of the motorcycle. Tank 192 is shaped to fit the space available and may, for example, have a recess 194 in the underside to allow passage of motorcycle drive components. Tank 192 may typically be formed from aluminum, steel or suitable plastic materials. Inlet 196 is located in recess 198 in one side of body 14. If desired, a door may be provided over recess 198 or a suitable cap may be used directly over inlet 196. Fill pipe 200 extends entirely across the top of tank 192 from side to side, connecting to the tank adjacent to the far wall thereof. This fill pipe arrangement significantly limits fuel spillage during an upset type accident. If the motorcycle tips onto the side having inlet 196, only the fuel which might be in fill pipe 200 could spill if the cap over inlet 196 came loose. With the motorcycle on that side, the junction between fill pipe 200 and tank top 201 will be well above the level of fuel in the tank. Should the motorcycle fall on the other side, no fuel will spill, since inlet 196 will, of course, be above the fuel level. Body 14 and cage 16 will also protect tank 192 against any direct impacts which might otherwise rupture the tank wall.

FIG. 10 shows a schematic perspective view of an embodiment of my motorcycle which is especially adapted to police work, where collisions during high speed chases are not uncommon. As seen in FIG. 10, Police Officer 210 has moved body restraint 76 up and hooked it to fin 27 by hook 96. The lower outer corner 22 of door 20 is in contact with the ground, serving as a sturdy side support. Roll bar 26 serves as a convenient mount for rear view mirrors 212 and radio antennas 214. Emergency lights 216 may be mounted on fin 27. Radio speakers (not shown) may be mounted in head rest 28 so as to be easily heard by the rider over street noise. Police Officer 210 may use either a hand microphone 218 when stopped as shown, or a microphone embedded in the padded collar on body restraint 76, actuated by a press-to-talk switch (not shown) on the handlebars. If an emergency arises, Police Officer 210 steps into body 14 through door 20, pulls down and latches body restraint 76, balances the motorcycle with his feet on the ground, closes door 20, starts the engine and moves out. The rear portion of body 14 can be enlarged as desired to carry emergency supplies, etc. The motorcycle has sufficient size to be noticeable in traffic, so with body 14 and the safety features described above, the Officer is both comfortable and safe.

Padding 250 which surrounds the rider and covers the inside of body 14 is best seen in FIGS. 10 and 11, with a portion cutaway on door 20 in FIG. 10 to illustrate the preferred arrangement. As seen in the cutaway area, a layer of metal honeycomb material 252 is bonded to the inner body surface. A layer of metal foil 254 is laminated over honeycomb 252. Next, a layer of semi-resilient plastic foam (such as closed cell polyethylene foam) is laminated to foil 254. Finally, the inside surface is covered with a protective layer 258 of vinyl or other protective sheet material.

FIG. 11 shows in schematic perspective view another embodiment of my crash-resistant motorcycle, modified to carry two riders in tandem. In this embodiment, the rear portion of body 14 is enlarged to accommodate a second seat 220 and second body restraint 222 substantially identical to seat 70 and body restraint 76. Two sets of shock absorber and seat retrieval assemblies (not shown in FIG. 11) are provided, with the cables to the front seat passing below the back seat and between the back rider's knees. To permit unobstructed forward motion of the aft rider in a collision, it is preferred that a pair of padded side roll bars 224 be used in place of overhead roll bar 26. Because of the roll bar change, larger headrests 226 may be preferred. Since straps 68 between body restraint and headrest 226 are somewhat flexible, a suitable latch means 230 (such as "Velcro ®" brand hook-and-eye fastener patches) may be used to hold body restraints 76 and 222 up and to the side when the riders are away from the motorcycle.

While certain specific arrangements, proportions and materials were detailed in the above description of preferred embodiments, these can be varied, where suitable, with similar results. For example, any suitable padding may be used for the various padded surfaces, such as multiple layers of rigid plastic foam and honeycomb which can be tailored to provide the optimum crush resistance and energy absorption characteristics required at each padded surface.

Other variations, applications and ramifications of this invention will occur to those skilled in the art upon reading the present disclosure. These are intended to be included within the scope of this invention, as defined by the appended claims.

I claim:

1. In a motorcycle having two wheels in tandem, a frame interconnecting said wheels, a steering assembly for steering at least one wheel and a seat assembly for supporting at least one rider, the improvement wherein said seat assembly comprises:
    a body restraint to hold the rider in the seat;
    a shock absorber mounted rigidly to the motorcycle frame;
    an actuating cable extending from said shock absorber to the back of said seat; and
    a retraction system connected to the back of said seat urging said seat toward the normal position for use;
    whereby said seat is movable forwardly in response to inertial forces upon frontal impact between the motorcycle and another object, with said shock absorber absorbing impact energy, with said retrieval system returning said seat to approximately the original position once impact energy has been absorbed.

2. The improvement according to claim 1 wherein said shock absorber is a constant force shock absorber wherein a plug of a first cross-sectional configuration is pulled by said actuating cable through a tube of a different cross-sectional configuration, the external cross-sectional area of said plug being substantially equal to the internal cross-sectional area of said tube.

3. The improvement according to claim 1 wherein said retrieval system comprises:
    a tension spring secured at one end to the motorcycle structure behind said seat;
    a block-and-tackle assembly fastened to the second end of said spring and to a support means adjacent to said seat; and
    the cable of said block-and-tackle assembly being fastened to the back of said seat;
    whereby forward movement of said seat under frontal impact force extends said cable, moves the blocks of said block-and-tackle together and extends said spring so that once said shock absorber has absorbed the impact energy, said spring pulls the blocks apart, retracting said cable and returning said seat to approximately the original position.

* * * * *